(12) United States Patent
Kim et al.

(10) Patent No.: US 11,734,934 B2
(45) Date of Patent: Aug. 22, 2023

(54) MIXED REALITY-BASED EXPERIENCE SIMULATOR

(71) Applicant: GIST(Gwangju Institute of Science and Technology), Gwangju (KR)

(72) Inventors: Seung Jun Kim, Gwangju (KR); Gwang Bin Kim, Gwangju (KR); Do Hyeon Yeo, Gwangju (KR); Ji Eun Lee, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 397 days.

(21) Appl. No.: 17/015,242

(22) Filed: Sep. 9, 2020

(65) Prior Publication Data
US 2021/0350144 A1 Nov. 11, 2021

(30) Foreign Application Priority Data
May 11, 2020 (KR) .......................... 10-2020-0056099

(51) Int. Cl.
*G06V 20/56* (2022.01)
*G06F 1/16* (2006.01)
(Continued)

(52) U.S. Cl.
CPC ........... *G06V 20/56* (2022.01); *B60W 60/001* (2020.02); *G06F 1/163* (2013.01); *G06V 20/20* (2022.01);
(Continued)

(58) Field of Classification Search
CPC ..... G06V 20/56; G06V 20/20; B60W 60/001; B60W 2540/18; B60W 2540/225;
(Continued)

(56) References Cited

U.S. PATENT DOCUMENTS

| 7,584,030 B1 | 9/2009 | Graham | |
|---|---|---|---|
| 2014/0118225 A1* | 5/2014 | Jerauld | G06V 40/20 |
| | | | 345/8 |

(Continued)

FOREIGN PATENT DOCUMENTS

| CN | 104670091 B * | 4/2017 | ............... B60R 1/00 |
|---|---|---|---|
| KR | 10-1515496 A | 5/2015 | |

(Continued)

OTHER PUBLICATIONS

"Björn Blissing et al., Augmented and Mixed Reality as a tool for evaluation of Vehicle Active Safety Systems, Oct. 23-25, 2013, International Conference Road Safety and Simulation, Rome, Italy" (Year: 2013).*

(Continued)

*Primary Examiner* — Andrae S Allison
*Assistant Examiner* — Phuong Hau Cai
(74) *Attorney, Agent, or Firm* — Stuedebaker & Brackett PC (57) ABSTRACT

Provided is a mixed reality-based experience simulator including an imaging part including first and second cameras installed on an experience object to capture images of different viewpoints from the experience object, a display part worn by a participant and configured to display a mixed reality image of the experience object to the participant, and an image processing unit configured to provide the mixed reality image to the display part and configured to generate the mixed reality image such that images captured by the first and second cameras are included in the mixed reality image. The mixed reality-based experience simulator according to the present invention generates a mixed reality image on the basis of images captured by a plurality of cameras installed on an experience object and provides the (Continued)

generated mixed reality image to a participant so that a more realistic experience is provided.

9 Claims, 7 Drawing Sheets

(51) Int. Cl.
  *B60W 60/00* (2020.01)
  *G06V 20/20* (2022.01)
(52) U.S. Cl.
  CPC ... *B60W 2540/18* (2013.01); *B60W 2540/225* (2020.02)
(58) Field of Classification Search
  CPC ......... G06F 1/163; G06F 3/011; G09B 9/042; G06T 19/006; H04N 5/265; H04N 13/243; H04N 13/282
  See application file for complete search history.

(56) References Cited

U.S. PATENT DOCUMENTS

| | | | |
|---|---|---|---|
| 2014/0327775 A1* | 11/2014 | Cho | G06F 3/016 348/148 |
| 2018/0154854 A1 | 6/2018 | Thieberger et al. | |
| 2019/0049950 A1* | 2/2019 | Poornachandran | G05D 1/0088 |

FOREIGN PATENT DOCUMENTS

| | | | | |
|---|---|---|---|---|
| KR | 20180013162 A | * | 2/2018 | ............ B60K 35/00 |
| WO | WO-2017018844 A1 | * | 2/2017 | ............ B60K 35/00 |
| WO | WO-2019082774 A1 | * | 5/2019 | ............ B60K 35/00 |

OTHER PUBLICATIONS

An Office Action mailed by the Korean Intellectual Property Office dated Nov. 5, 2021, which corresponds to Korean Patent Application No. 10-2020-0056099 and is related to U.S. Appl. No. 17/015,242.
A Notice of Allowance mailed by the Korean Intellectual Property Office dated Feb. 8, 2023, which corresponds to Korean Patent Application No. 10-2020-0056099 and is related to U.S. Appl. No. 17/015,242.
Do Hyeon Yeo "Mixed-reality Automotive driving XIMulation", 2019 IEEE International Symposium on Mixed and Augmented Reality Adjunct (ISMAR-Adjunct); published Oct. 14, 2019.
Do Hyeon Yeo "Toward Immersive Self-Driving Simulations: Reports from a User Study across Six Platforms", CHI 20: Proceedings of the 2020 CHI Conference on Human Factors in Computing Systems; published Apr. 21, 2020.

* cited by examiner

MIXED REALITY-BASED EXPERIENCE SIMULATOR

CROSS-REFERENCE TO RELATED APPLICATION

This application claims priority to and the benefit of Korean Patent Application No. 10-2020-0056099, filed on May 11, 2020, the disclosure of which is incorporated herein by reference in its entirety.

BACKGROUND

1. Field of the Invention

The present invention relates to a mixed reality-based experience simulator, and more specifically, to a mixed reality-based experience simulator that provides a participant with a mixed reality image obtained by mixing a virtual object (e.g., a vehicle body interior frame and an infotainment system) implemented as computer graphics into images streamed in real time from a plurality of cameras installed on an experience object.

2. Discussion of Related Art

In recent years, a great deal of research has been conducted on an unmanned autonomous driving system, particularly, autonomous driving in the fields of robots or vehicles.

Generally, an autonomous driving system may allow a vehicle to move while automatically controlling travel of the vehicle from a starting point to an ending point on a road on the basis of road map information using global positioning system (GPS) location information and signals obtained from various types of sensors.

An experience simulator for experiencing the autonomous driving system includes a camera installed on a moving vehicle and provides a participant with an image captured by the camera for the experience of the autonomous driving vehicle.

However, since the conventional driving simulator provides a participant with an image captured by a single camera, a range of user experience is limited, which leads to difficulty in providing a more realistic experience to the user.

RELATED ART DOCUMENT

Patent Document

Korean Registered Patent No. 10-1515496: Simulation System for Autonomous Vehicle for Applying Obstacle Information in Virtual Reality

SUMMARY OF THE INVENTION

The present invention is directed to providing a mixed reality-based experience simulator that provides a participant with a mixed reality image obtained by mixing a virtual object (e.g., a vehicle body interior frame and an infotainment system) implemented as computer graphics into images streamed in real time from a plurality of cameras installed on an experience object.

The technical objectives of the present invention are not limited to the above, and other objectives may become apparent to those of ordinary skill in the art based on the following descriptions.

According to an aspect of the present invention, there is provided a mixed reality-based experience simulator including an imaging part installed on an experience object and including a first camera and a second camera configured to capture images in different viewpoints from the experience object, a display part worn by a participant and configured to display a mixed reality image related to the experience object to the participant, and an image processing unit configured to provide the mixed reality image to the display part and configured to generate the mixed reality image such that images captured by the first and second cameras are included in the mixed reality image.

The mixed reality-based experience simulator may further include a measurement sensor part installed on the experience object to measure an operating state of the experience object, wherein the image processing unit may generate the mixed reality image so that information measured by the measurement sensor part is included in the mixed reality image.

The experience object may include a main body provided with a driver's seat and a plurality of seats, a driving unit installed on the main body to move the main body, a steering unit provided on the main body to control a direction in which the main body is moved; and a manipulation unit installed on the main body adjacent to the driver's seat so that the driving unit and the steering unit are manipulated by the driver seated in the driver's seat.

The participant may view the mixed reality image displayed on the display part in a state in which the participant is seated in the seat of the experience object that is caused to travel by manipulation of the driver seated in the driver's seat.

The mixed reality image may be an image related to a first-person view in a forward direction of the experience object from the driver's seat.

The image processing unit may generate the mixed reality image such that an image in a rearward direction of the experience object is included in the mixed reality image.

The first camera may capture the image in the forward direction of the experience object, and the second camera may capture the image in the rearward direction of the experience object.

The image processing unit may generate the mixed reality image in which the image captured by the first camera and the image captured by the second camera may overlap each other.

The mixed reality image may include a rear-view mirror object that displays an image in a direction toward a rear center range of the main body.

The image processing unit may generate the mixed reality image such that an image, among the images captured by the second camera, that is related to a region corresponding to the rear center range of the main body may be displayed on the rear-view mirror object.

The mixed reality image may include at least one side mirror object for displaying an image of a left rear side range or a right rear side range of the main body.

The image processing unit may generate the mixed reality image such that the image of the left rear side range and the right rear side range of the main body among the images captured by the second camera may be displayed on the side mirror object.

The first camera may be installed in front of the experience object and may image a region of 360 degrees with respect to an installation position on the experience object.

The second camera may be installed behind the experience object and may image a region of 360 degrees with respect to an installation position on the experience object.

The display part may include a wearing member worn on a head of the participant; and a display module installed on the wearing member corresponding to a field of view of the participant to output the mixed reality image.

The mixed reality-based experienced simulator may further include a head detection sensor installed on the display part or the experience object to detect motion of the head of the participant wearing the display part, wherein the image processing unit may change a viewpoint of the mixed reality image to correspond to a gaze change of the participant wearing the display part on the basis of detection information received from the head detection sensor and to provide the mixed reality image in which the viewpoint is changed.

The experience object may be a transportation device that is caused to travel by manipulation of a driver, wherein the measurement sensor part may be provided with a scanner connector that is connected to an on-board diagnostic (OBD) provided on the experience object to collect travelling information of the experience object to acquire the travelling information of the experience object, and may provide the image processing unit with the travelling information as information regarding the operating state of the experience object.

The measurement sensor part may be provided with a motion detection sensor installed on the experience object to detect a motion of the experience object and may provide the image processing unit with information regarding the measured motion as regarding the operating state of the experience object.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a mixed reality-based experience simulator according to an embodiment of the present invention will be described in detail with reference to the accompanying drawings. While the present invention is susceptible to various modifications and alternative embodiments, specific embodiments thereof are shown by way of example in the accompanying drawings and will be described. However, it should be understood that there is no intention to limit the present invention to the particular embodiments disclosed, and on the contrary, the present invention is to cover all modifications, equivalents, and alternatives falling within the spirit and scope of the present invention. In the description of the drawings, the same drawing reference numerals will be understood to refer to the same elements, features, and structures. In the accompanying drawings, the shape and size of each component shown in the drawings can be exaggerated for clarity of explanation.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention.

The terminology used herein is for the purpose of describing particular embodiments only and is not intended to be limiting to the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
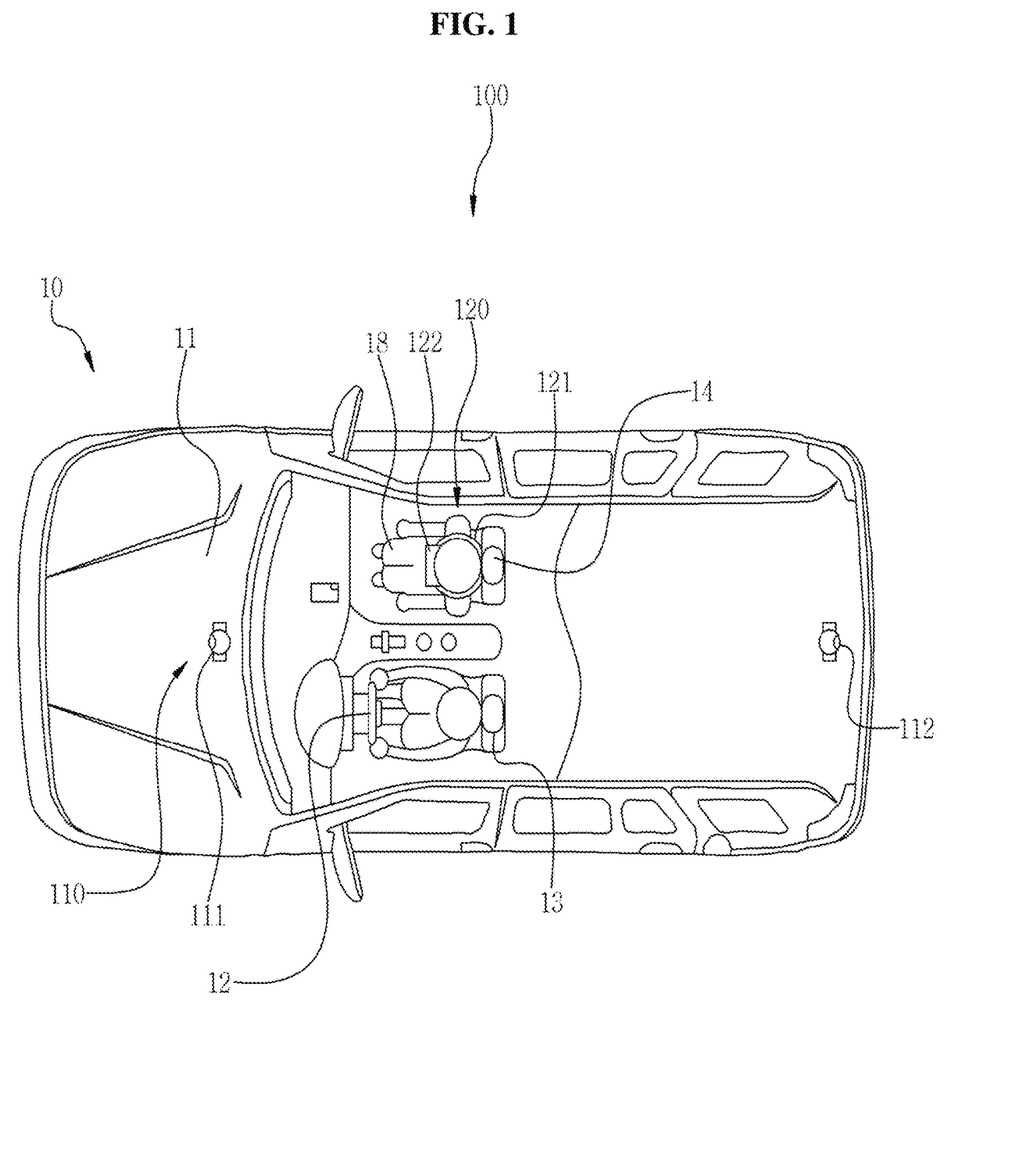
FIG. 1 is a conceptual diagram illustrating a mixed reality-based experience simulator according to the present invention.
Figure 2:
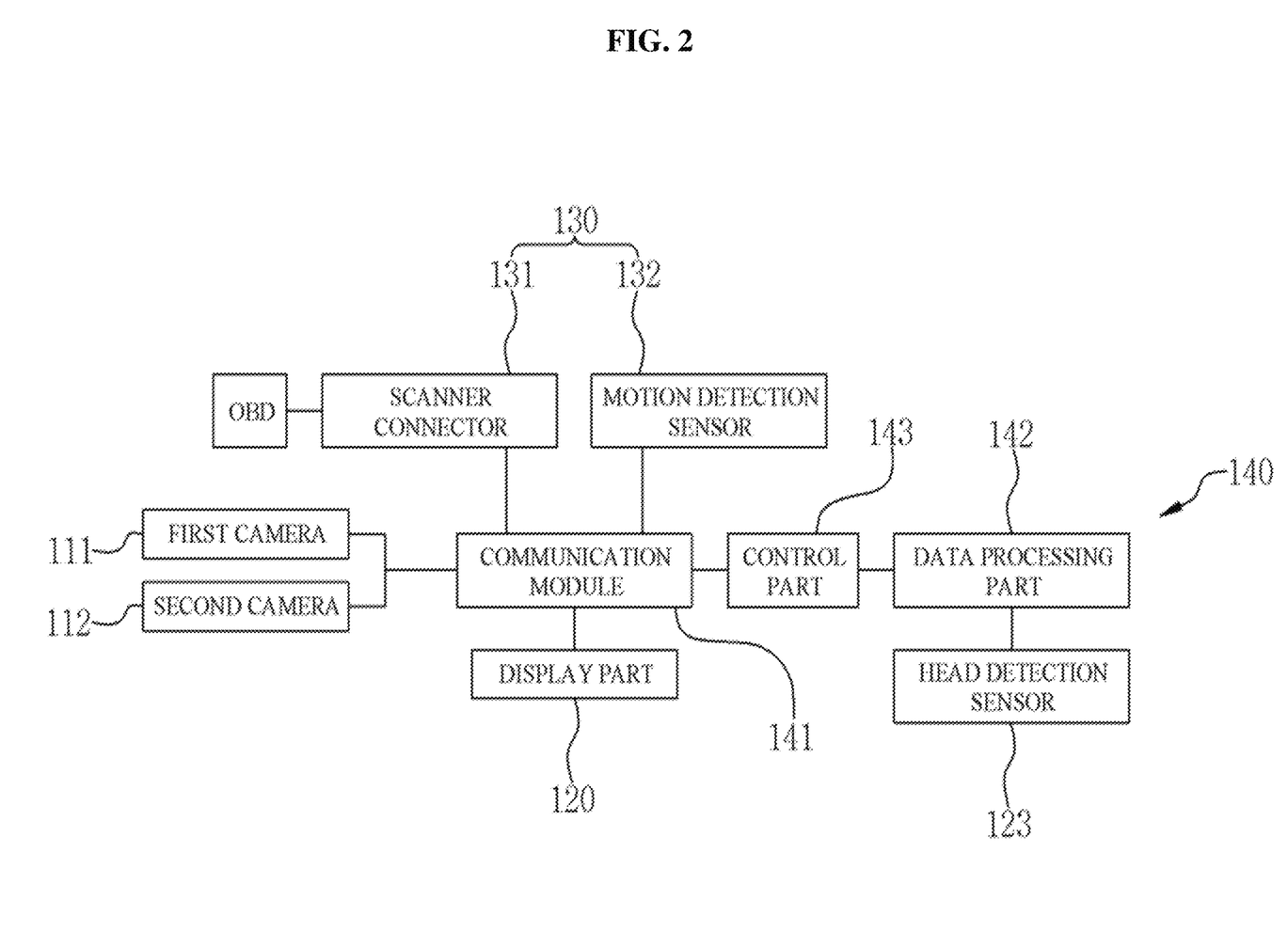
FIG. 2 is a block diagram illustrating the mixed reality-based experience simulator of FIG. 1.

FIGS. 1 and 2 illustrate a mixed reality-based experience simulator 100 according to the present invention.

Referring to the drawings, the mixed reality-based experience simulator 100 includes an imaging part 110 including a first camera 111 and a second camera 112 installed on an experience object 10 to capture images of different viewpoints from the experience object 10, a display part 120 worn by a participant 18 and configured to display a mixed reality image of the experience object 10 to the participant 18, a measurement sensor part 130 installed on the experience object 10 to measure an operating state of the experience object 10, and an image processing unit 140 configured to provide the mixed reality image to the display part 120, the image processing unit 140 configured to generate the mixed reality image such that images captured by the first and second cameras 111 and 112 are included in the mixed reality image.

Here, the experience object 10 is a transportation device that is caused to travel by manipulation of a driver and includes a main body 11 provided with a driver's seat 13 and a plurality of seats 14, a driving unit installed in the main body 11 to move the main body 11, a steering unit provided in the main body 11 to control a direction of the main body 11 being moved, and a manipulation unit 12 installed on the main body 11 adjacent to the driver's seat 13 for a driver seated in the driver's seat 13 to manipulate the driving unit and the steering unit.

The main body 11 is provided with an interior space in which the driver's seat 13 and the plurality of seats 14 are installed, and windows installed in front, rear, and left, and right sides of the main body 11 that allow the outside to be viewed from the interior space. The driver's seat 13 is preferably provided on the front left side in the main body 11.

The driving unit includes a plurality of front wheels rotatably installed on the front side of the main body 11 so as to turn in the left and right directions, a plurality of rear wheels installed on the rear side of the main body 11, an engine part installed on the main body 11 to generate rotational force by fuel suppled thereto, and a power transmission part that provides the rotational force generated by the engine part to the front or rear wheels.

Although not shown, the steering unit rotates the front wheels such that a heading direction of the main body 11 is changed by the driver manipulation of the manipulation unit 12. The manipulation unit 12 is manipulated by a driver seated in the driver's seat 13, and includes a handle, a gear bar, and the like. Since the steering unit and the driving unit are driving devices generally used in the related art to drive a vehicle, detailed descriptions thereof are omitted. In this case, the experience object 10 is provided using a vehicle, such as an automobile that may be generally used in the related art.

In addition, the experience object 10 may further include an on-board diagnostic (OBD). The OBD is an in-vehicle sensor provided in advance in the vehicle, for example, a device that may not only detect all pieces of travelling information of an interior of the vehicle, including deceleration and deceleration/acceleration of the vehicle through a speed sensor, an acceleration sensor, a door opening/closing sensor, a sudden stop detection sensor, a brake pedal operation detection sensor, and the like, but also collect information, such as running time, running distance, accident detection, time and distance in a certain period of driving, sudden acceleration and sudden braking, or collect cooling water, brake oil, engine oil, engine revolutions per minute (RPM), engine vibration, engine sound, tire air pressure, acceleration of the vehicle, deceleration/acceleration, average speed, abnormality of safety equipment, such as anti-lock braking system (ABS) and airbags, battery voltage, and the like.

Meanwhile, the participant 18 views the mixed reality image displayed on the display part 120 in a state in which the participant 18 is seated in the seat 14 of the experience object 10 that is caused to travel by manipulation of the driver seated in the driver's seat 13. That is, the driver seated in the driver's seat 13 drives the experience object 10, and the participant 18 experiences the mixed reality image while being seated in the seat 14 excluding the driver's seat 13 of the experience object 10.

The first camera 111 is provided to capture an image in a forward direction of the experience object 10 and is installed in front of the main body 11 of the experience object 10. That is, the first camera 111 is installed on the main body 11 at a position spaced forward from the driver's seat 13. Here, the first camera 111 preferably captures an image of a region of 360 degrees with respect to the installation position on the experience object 10. The image captured by the first camera 111 is provided to the image processing unit 140.

The second camera 112 is provided to capture an image in a rearward direction of the experience object 10 and is installed behind the main body 11 of the experience object 10. That is, the second camera 112 is installed on the main body 11 at a position spaced backward from the driver's seat 13. Here, the second camera 112 preferably captures an image of a region of 360 degrees with respect to the installation position on the experience object 10. The image captured by the second camera 112 is provided to the image processing unit 140.

The display part 120 includes a wearing member 121 worn on the head of the participant 18 and a display module 122 installed on the wearing member 121 corresponding to a field of view of the participant 18 to output the mixed reality image.

The wearing member 121 is formed with a hollow in a vertical direction so that the head of the participant 18 is inserted into the hollow, and a cushion member (not shown) is installed on an inner surface of the wearing member 121 to provide a predetermined cushion feeling. The display module 122 is installed on a front portion of the wearing member 121 and is arranged to be positioned in front of the user's eyes when the wearing member 121 is worn by the participant 18 so as to output an image in the field of view of the participant 18.

In this case, the display part 120 is further provided with a communication part installed on the wearing member 121 to communicate with the image processing unit 140. The communication part receives a mixed reality image from the image processing unit 140 using a wired or wireless communication network. The communication part delivers the mixed reality image provided from the image processing unit 140 to the display module 122.

The display part 120 configured as described above is preferably provided using a head mounted display (HMD) worn on the face of the participant 18.

Meanwhile, the mixed reality-based experience simulator 100 according to the present invention further includes a head detection sensor 123 configured to detect the head movement of the participant 18 wearing the display part 120. Although not shown in the drawing, the head detection sensor 123 is installed on one side of the wearing member 121 and is provided using an inertial sensor capable of measuring 3-axis angular velocity data and 3-axis acceleration data of the wearing member 121. In addition, the head detection sensor 123 is not limited thereto and may be provided using a plurality of tracker sensors that are installed to be spaced apart from each other inside the main body 11 of the experience object 10 to detect the movement of the display part 120. The head detection sensor 123 transmits detection information of the head movement of the participant 18 to the image processing unit 140 through a wired or wireless communication network.

The measurement sensor part 130 includes a scanner connector 131 connected to the OBD provided on the experience object 10 to obtain travelling information of the experience object 10, and a motion detection sensor 132 installed on the experience object 10 to detect the motion of the experience object 10.

The scanner connector 131 is connected to the OBD to obtain travelling information of the experience object 10. Here, the travelling information may include information, such as running time, running distance, accident detection, time and distance in a certain period of driving, and occurrence of sudden acceleration and sudden braking, or cooling water, brake oil, engine oil, engine RPM, engine vibration, engine sound, tire pressure, vehicle speed, acceleration, deceleration/acceleration, average speed, abnormalities of safety equipment, such as ABS and airbag, battery voltage, and the like. The scanner connector 131 provides the travelling information to the image processing unit 140 as information regarding the operating state of the experience object 10.

The motion detection sensor 132 is installed in the main body 11 and is provided using an inertial measurement unit (IMU). The motion detection sensor 132 detects a tilt of the main body 11, a heading direction, and the like during travel of the experience object 10. The motion detection sensor 132 provides information regarding the measured motion to the image processing unit 140 as information regarding the operating state of the experience object 10.

The image processing unit 140 includes a communication module 141 that receives the captured images of the first and second cameras 111 and 112 and detection information of the head detection sensor 123 or transmits a mixed reality image to the display part 120 through a wired or wireless communication network, a data processing part 142 that generates a mixed reality image provided to the display part 120 on the basis of the captured images of the first and second cameras 111 and 112 and the detection information of the head detection sensor 123, and a control part 143 that transmits the mixed reality image generated by the data processing part 142 to the display part 120 through the communication module 141.

The communication module 141 communicates with the measurement sensor part 130 and the display part 120 through a wired or wireless communication network. In this case, the wireless communication network may be provided using a wireless local area network (WLAN), a Digital Living Network Alliance (DLNA), a wireless broadband (WiBro), a World Interoperability for Microwave Access (WiMAX), a Global System for Mobile Communication (GSM), code-division multiaccess (CDMA), code-division multi access 2000 (CDMA2000), Enhanced Voice-Data Optimized Or Enhanced Voice-Data Only (EV-DO), wideband CDMA (WCDMA), IEEE 802.16, Long-Term Evolution (LTE), Long-Term Evolution-Advanced (LTEA), wireless mobile broadband service (WMBS), and the like.

The data processing part 142 generates a mixed reality image provided to the display part 120 on the basis of the captured images of the first and second cameras 111 and 112 and the detection information of the head detection sensor 123. Here, the mixed reality image is preferably an image of a first-person view in a forward direction of the experience object 10 from the driver's seat 13 as show in FIG. 3. That is, the mixed reality image includes a handle, a dashboard, windows, and the like of the vehicle to correspond to an on-road vehicle, and in an area corresponding to the window, includes an image in the forward direction of the experience object 10.

Figure 3:
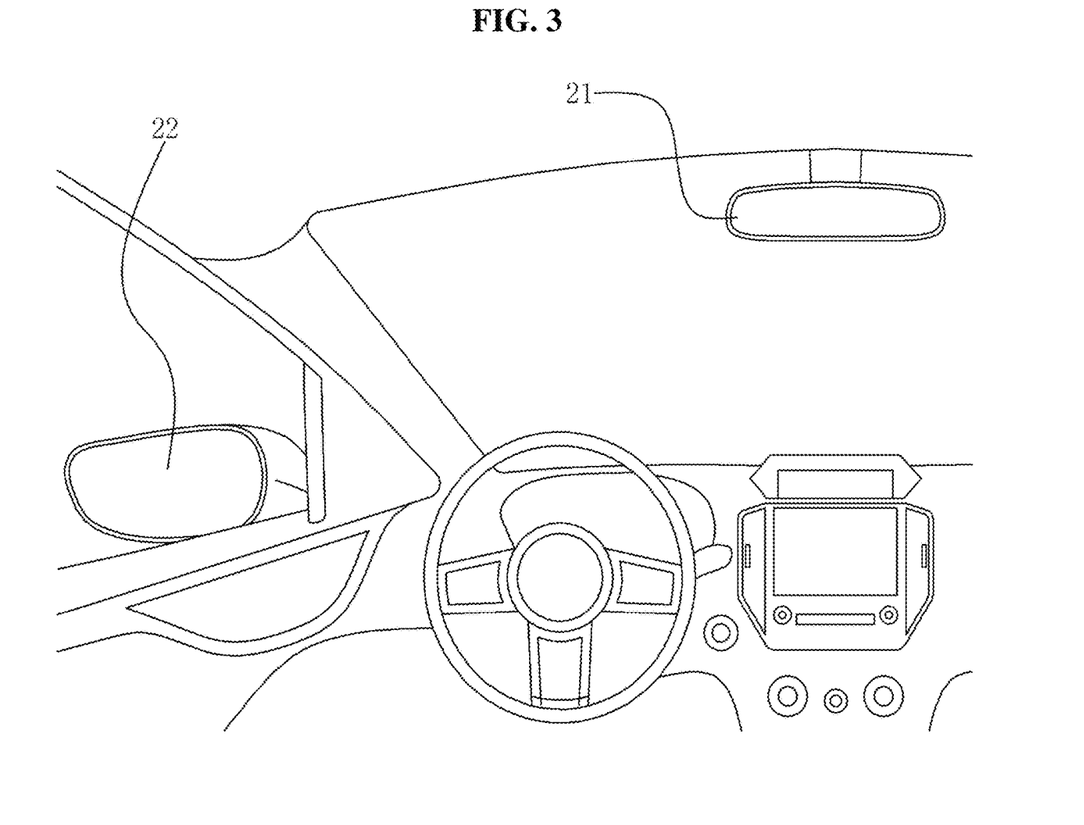
FIG. 3 is a diagram illustrating an example of a mixed reality image provided by the mixed reality-based experience simulator of FIG. 1.

Here, the data processing part 142 displays an image provided from the first camera 111 on the area corresponding to the window in the mixed reality image. In addition, the data processing part 142 may change the viewpoint of the mixed reality image in response to a change of a gaze of the participant 18 wearing the display part 120 on the basis of the detection information provided from the head detection sensor 123 in generation of the mixed reality image.

Meanwhile, the data processing part 142 may generate the mixed reality image such that an image in a rearward direction of the experience object 10 is included in the mixed reality image. That is, the data processing part may generate the mixed reality image such that the image captured by the second camera 112 overlaps the image captured by the first camera 111.

Here, the mixed reality image includes a rear-view mirror object 21 and a side mirror object 22 to correspond to the rear-view mirror and the side mirror of the on-road vehicle. The rear-view mirror object 21 is located at an upper center of the dashboard of the mixed reality image, and the data processing part 142 generates the mixed reality image such that an image of a region corresponding to the rear center range of the main body 11 among the images captured by the second camera 112 is displayed on the rear-view mirror object 21. In addition, the side mirror objects 22 are provided on the left and right sides of the dashboard of the mixed reality image, and the data processing part 142 generates the mixed reality image such that an image of a region corresponding to a left rear side or right rear side range among the images captured by the second camera 112 is displayed on the side mirror object 22. In this case, the rear-view mirror object 21 and the side mirror object 22 preferably display a rear image of the main body 11 to vary the view point in response to a change of a gaze of the participant 18 on the basis of the detection information provided by the 123 as though a rear view mirror and a side mirror of an on-road vehicle show a rear view of the vehicle.

Meanwhile, the data processing part 142 may generate the mixed reality image such that information measured by the measurement sensor part 130 is included in the mixed reality image. That is, the data processing part 142 generates the mixed reality image such that the travelling information provided by the scanner connector 131 and the motion information provided by the motion detection sensor 132 are displayed. In this case, the data processing part 142 may display the corresponding travelling information and motion information in the form of text or graphs.

The control part 143 is provided with a control panel (not shown) installed in the main body 11 and through which the participant 18 may input a control signal for starting or stopping a virtual experience, and when the participant 18 inputs a signal for starting the virtual experience through the control panel, the control part 143 transmits the mixed reality image generated by the data processing part 142 to the display part 120. In addition, the control part 143 stops the operation of the data processing part 142 when the user 18 inputs a signal for stopping the virtual experience through the control panel.

The mixed reality-based experience simulator 100 according to the present invention configured as described above allows the participant 18 to view the mixed reality image in the experience object 10, such as a vehicle driven by a driver rather than the participant 18, so that the participant 18 is provided with a sensation corresponding to the mixed reality image viewed by the participant 18, and thus a more realistic experience of riding an on-road autonomous driving vehicle is provided.

Meanwhile, in order to evaluate the fidelity and presence, and simulator motion sickness of the mixed reality-based experience simulator 100 according to the present invention, twenty participants were selected and subject to experience of the simulator according to the present invention and the existing four simulators (① virtual reality+no motion, ② multiscreen+a motion platform, ③ virtual reality+a motion platform, and ④ virtual reality+an on-road vehicle), and the satisfaction and discomfort of the experience were surveyed. During the motion platform experiment, the participant 18 was seated on a motion platform, and in the case of the experiment conducted in an on-road vehicle, a driver driving a vehicle was seated in a driver's seat 13 of the vehicle, and the participant 18 was seated in a seat on the right side of the driver's seat 13. All the simulator experiments were conducted by driving the vehicle in the same predetermined path. After each experience was completed, satisfaction and simulation-related diseases were examined through a questionnaire.

Figure 4:
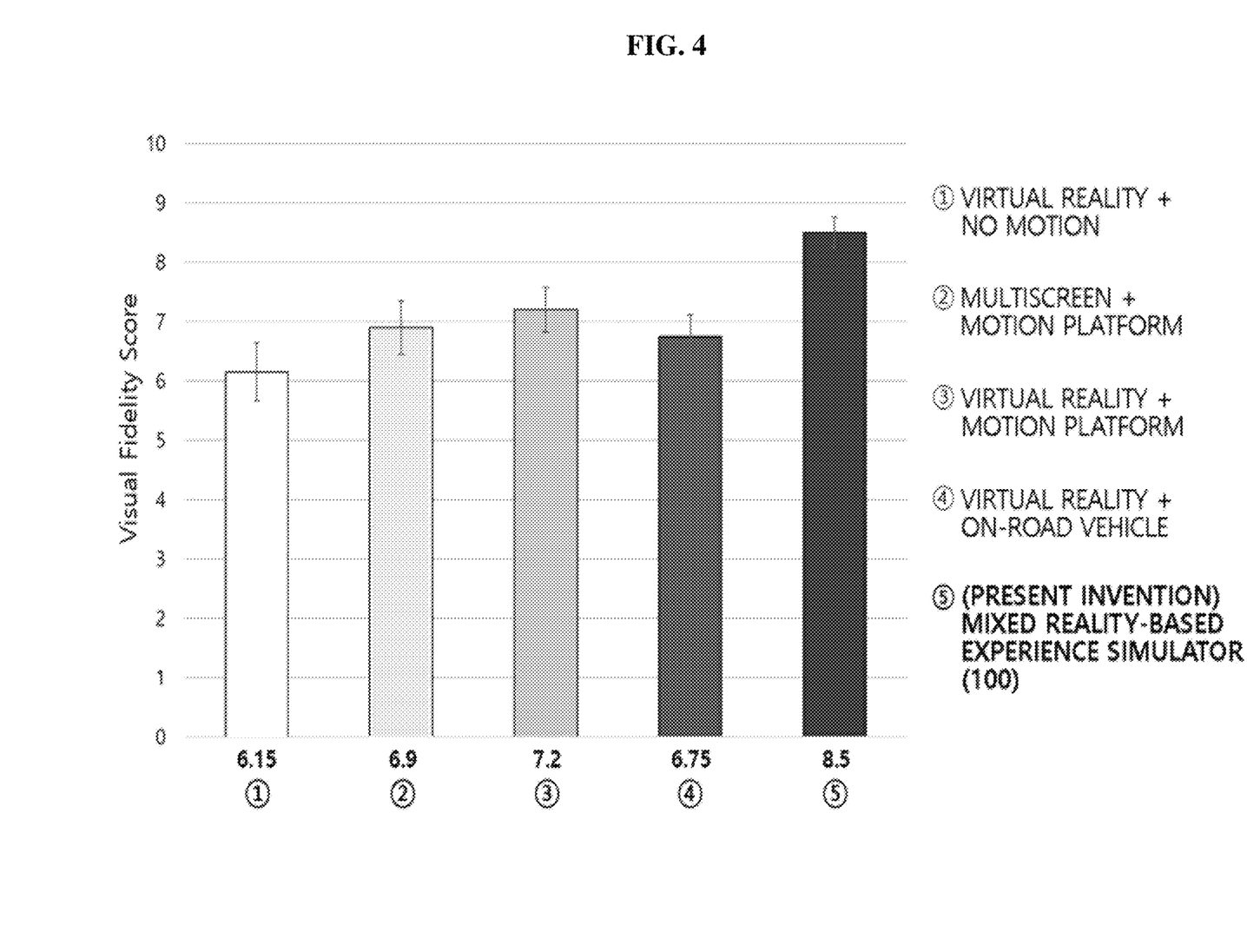
FIGS. 4 and 5 are diagrams showing results of a fidelity survey for the mixed reality-based experience simulator according to the present invention.
Figure 5:
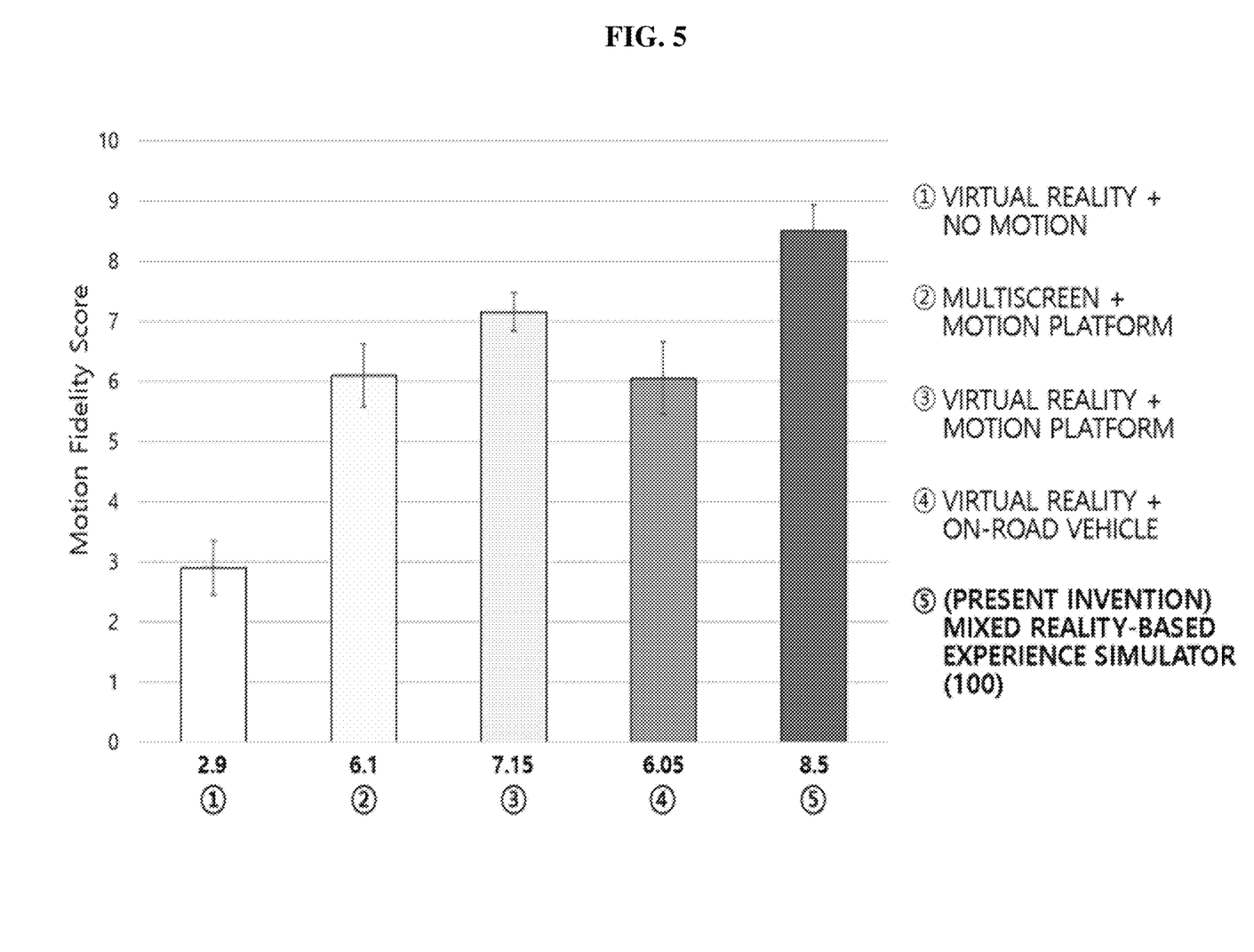

FIGS. 4 and 5 show the results of the fidelity-survey of the participant 18. Here, Visual Fidelity denotes a visual fidelity item, Motion Fidelity denotes a motion fidelity item, and a questionnaire survey was conducted on the basis of a perfect score of 10 for each item. Referring to the drawings, the present invention has obtained a high score in the visual fidelity item and the motion fidelity item.

Figure 6:
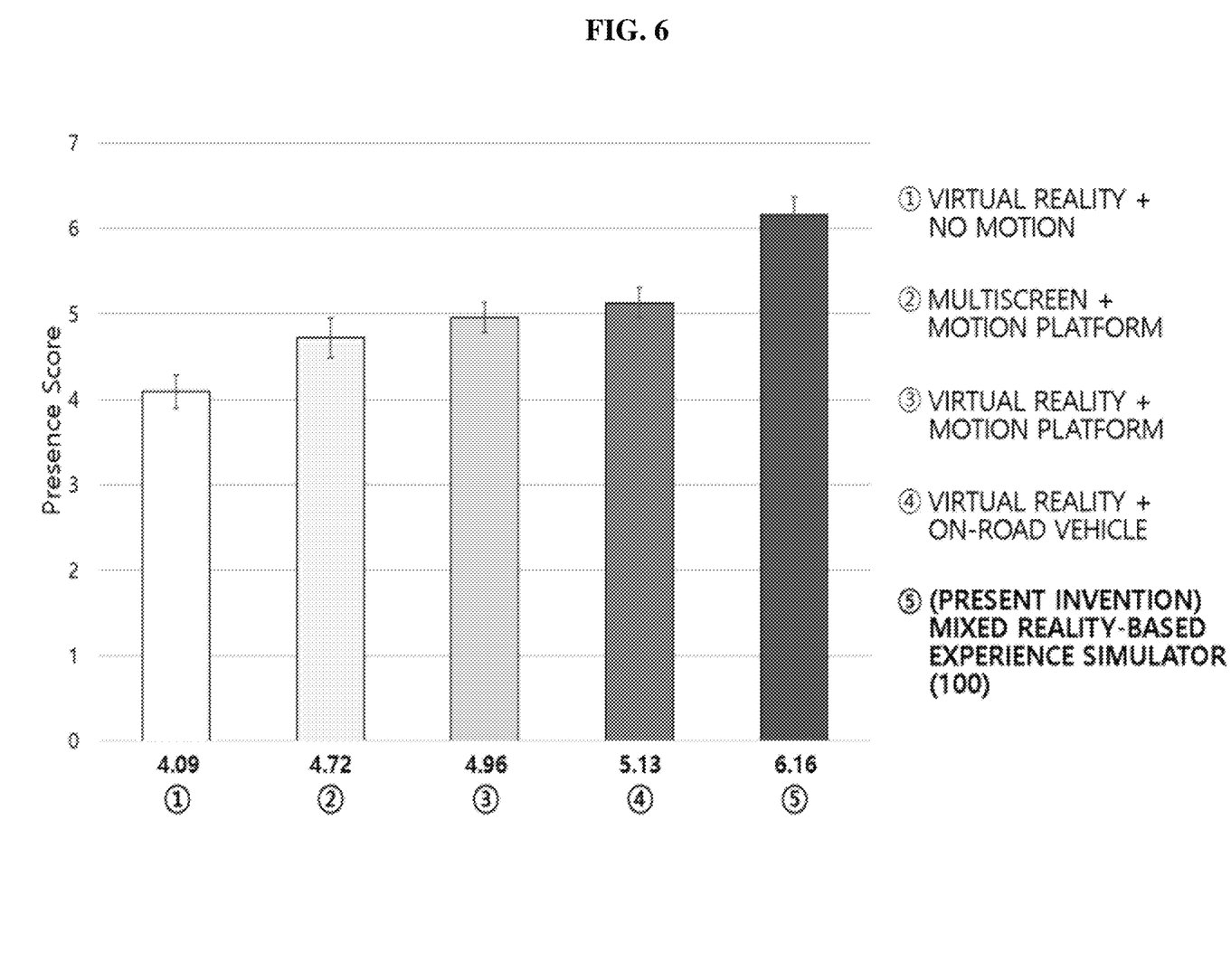
FIG. 6 is a diagram showing results of a presence survey for the mixed reality-based experience simulator according to the present invention.

FIG. 6 shows the results of the presence survey of the participant 18. For an involvement & control item, a naturalness item, an auditory item, a resolution item, and an interface quality item, the presence survey was conducted on the basis of a perfect score of 7 for each item and averaged. Referring to the drawings, the present invention has obtained a high score in the presence item.

Figure 7:
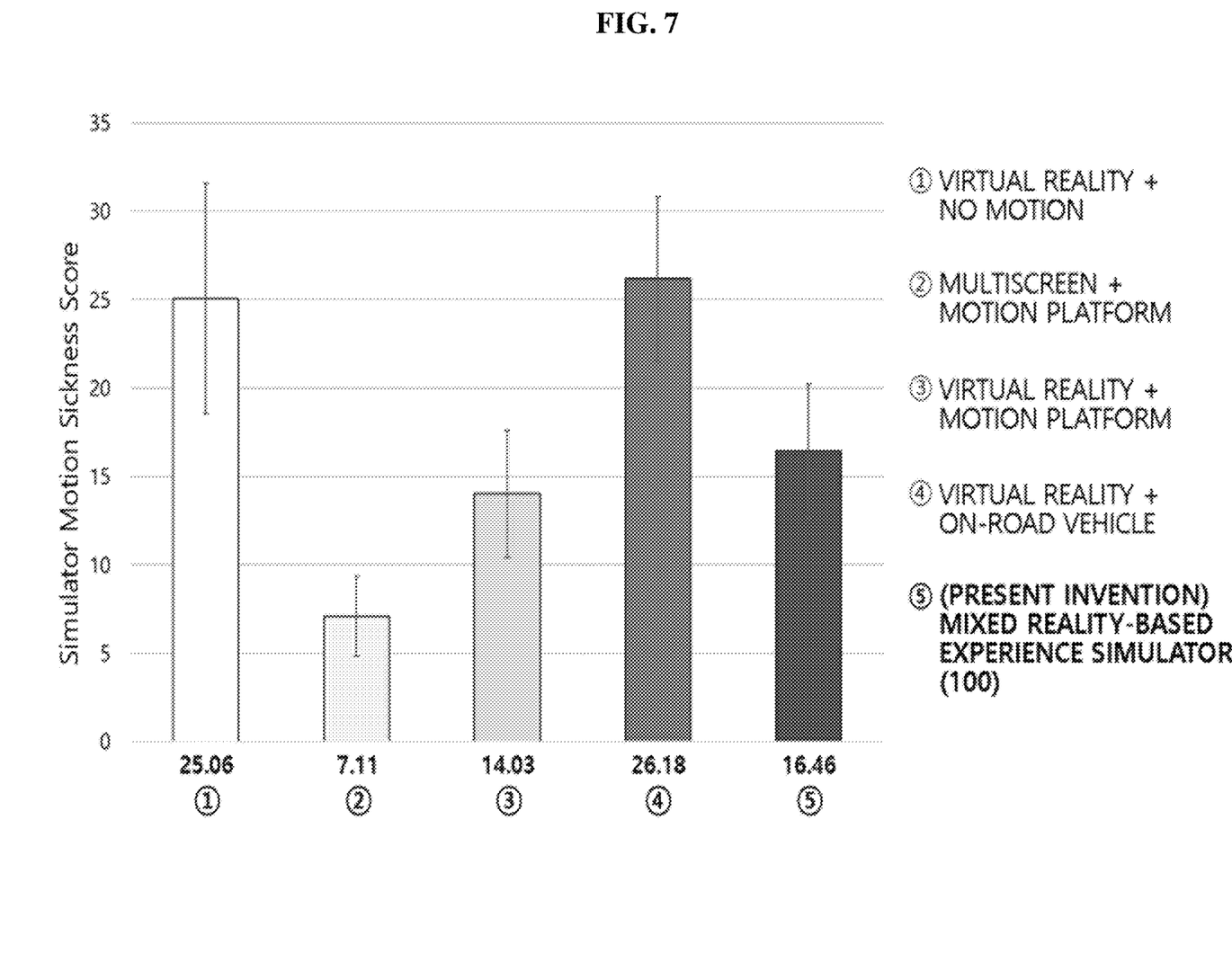
FIG. 7 is a diagram showing results of a survey on a simulator motion sickness for the mixed reality-based experience simulator according to the present invention.

FIG. 7 shows the results of the survey of a simulator motion sickness of the participant 18. For items consisting largely of a nausea item, an ocular discomfort item, and a disorientation item, the simulator motion sickness is obtained as a score obtained by multiplying each symptom score for each item and summing a preset weight to the symptom score. Referring to the drawings, it can be seen that the present invention has a relatively low degree of manifestation of simulator motion sickness symptoms.

As is apparent from the above, the mixed reality-based experience simulator according to the present invention generates a mixed reality image on the basis of images captured by a plurality of cameras installed on an experience object and provides the generated mixed reality image to a participant so that a more realistic experience can be provided.

Descriptions of the embodiments above are provided so that one of ordinary skill in the art to which the present invention pertains may use or perform the present invention. Various changes in form and details of the embodiments will be evident to one of ordinary skill in the art to which the present invention pertains, and general principles defined herein may be applied to other embodiments without departing from the scope of the present invention. Therefore, the present invention is not limited to the embodiments provided herein and should be interpreted in the broadest range that is consistent with the principles and new features provided herein.

What is claimed is:

1. A mixed reality-based experience simulator comprising:
   an imaging part installed on an experience object and including a first camera and a second camera configured to capture images in different viewpoints from the experience object;
   a display part configured to be worn by a participant who is sitting in a passenger seat, and configured to provide a mixed reality image having a view from a driver seat to the participant who is sitting in a passenger seat;
   a measurement sensor part installed on the experience object to measure an operating state of the experience object;
   a processor configured to generate the mixed reality image, and provide the mixed reality image to the display part,
   wherein the mixed reality image includes:
      a first image of a forward direction of the experience object, captured by the first camera, wherein the first image is displayed on a window object;
      a second image of a rearward direction of the experience object, captured by the second camera, wherein the second image is displayed on a rear-view mirror object, wherein the rear-view mirror object is a mirror installed in the experience object;
      a third image of a left rear side direction of the experience object or a fourth image of a right rear side direction of the experience object, captured by the second camera, wherein the third image or the fourth image is displayed on a side mirror object;
      a handle object;
      a dashboard object; and
      travelling information and motion information, measured by the measurement sensor part; and
   a head detection sensor installed on the display part or the experience object to detect motion of the head of the participant wearing the display part,
   wherein the processor is further configured to change a viewpoint of the mixed reality image to correspond to a gaze change of the participant wearing the display part on the basis of detection information received from the head detection sensor and provide the mixed reality image in which the viewpoint is changed.

2. The mixed reality-based experience simulator of claim 1, wherein the experience object includes:
   a main body provided with a driver's seat and a plurality of seats;
   a driving unit installed on the main body to move the main body;
   a steering unit provided on the main body to control a direction in which the main body is moved; and
   a manipulation unit installed on the main body adjacent to the driver's seat so that the driving unit and the steering unit are manipulated by the driver seated in the driver's seat.

3. The mixed reality-based experience simulator of claim 1, wherein the first camera is installed in front of the experience object and images a region of 360 degrees with respect to an installation position on the experience object.

4. The mixed reality-based experience simulator of claim 1, wherein the second camera is installed behind the experience object and images a region of 360 degrees with respect to an installation position on the experience object.

5. The mixed reality-based experience simulator of claim 1, wherein the display part includes:
   a wearing member worn on a head of the participant; and
   a display module installed on the wearing member corresponding to a field of view of the participant to output the mixed reality image.

6. The mixed reality-based experience simulator of claim 5, further comprising a head detection sensor installed on the display part or the experience object to detect motion of the head of the participant wearing the display part,
   wherein the processor changes a viewpoint of the mixed reality image to correspond to a gaze change of the participant wearing the display part on the basis of detection information received from the head detection sensor and provide the mixed reality image in which the viewpoint is changed.

7. The mixed reality-based experience simulator of claim 1, wherein the experience object is a transportation device that is caused to travel by manipulation of a driver,
   wherein the measurement sensor part is provided with a scanner connector that is connected to an on-board diagnostic (OBD) provided on the experience object to collect the travelling information of the experience object to acquire the travelling information of the experience object and provides the processor with the travelling information as information regarding the operating state of the experience object.

8. The mixed reality-based experience simulator of claim 7, wherein the measurement sensor part is provided with a motion detection sensor installed on the experience object to detect a motion of the experience object and provides the processor with the motion information regarding the measured motion as regarding the operating state of the experience object.

9. The mixed reality-based experience simulator of claim 1, wherein the measurement sensor part is provided with a motion detection sensor installed on the experience object to detect a motion of the experience object and provides the with the motion information regarding the measured motion as regarding the operating state of the experience object.

* * * * *